United States Patent
Uno

(10) Patent No.: US 9,231,484 B2
(45) Date of Patent: Jan. 5, 2016

(54) SWITCHING POWER SUPPLY APPARATUS

(71) Applicant: Murata Manufacturing Co., Ltd., Nagaokakyo-shi, Kyoto-fu (JP)

(72) Inventor: Yoshiyuki Uno, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 60 days.

(21) Appl. No.: 14/327,714

(22) Filed: Jul. 10, 2014

(65) Prior Publication Data
US 2015/0023068 A1 Jan. 22, 2015

(30) Foreign Application Priority Data

Jul. 19, 2013 (JP) .................................. 2013-150244

(51) Int. Cl.
H02M 3/335 (2006.01)
H02M 1/42 (2007.01)
H02M 1/00 (2007.01)

(52) U.S. Cl.
CPC ...... *H02M 3/33515* (2013.01); *H02M 3/33569* (2013.01); *H02M 2001/007* (2013.01); *H02M 2001/0025* (2013.01)

(58) Field of Classification Search
CPC ... H02M 1/42; H02M 1/4208; H02M 1/4225; H02M 1/4228; H02M 3/335; H02M 3/33515; H02M 7/155; Y02B 70/10
USPC .......................... 363/15, 16, 21.05, 21.13, 89
See application file for complete search history.

(56) References Cited

U.S. PATENT DOCUMENTS

| | | | |
|---|---|---|---|
| 7,688,608 B2 * | 3/2010 | Oettinger ............... | H02M 3/157 363/132 |
| 8,559,203 B2 * | 10/2013 | Uemura ............... | H02M 1/4225 323/222 |
| 2009/0243575 A1 | 10/2009 | Akiyama et al. | |
| 2011/0222318 A1 | 9/2011 | Uno et al. | |
| 2012/0236612 A1 | 9/2012 | Uno | |
| 2013/0250634 A1 * | 9/2013 | Fornage ................ | H02M 3/285 363/65 |
| 2014/0043866 A1 * | 2/2014 | Zhao ................. | H02M 3/33507 363/21.12 |

FOREIGN PATENT DOCUMENTS

| | | |
|---|---|---|
| JP | 2009-100496 A | 5/2009 |
| JP | 2009-240063 A | 10/2009 |
| JP | 2011-188632 A | 9/2011 |
| WO | 2010/109694 A1 | 9/2010 |

* cited by examiner

*Primary Examiner* — Gary L Laxton
(74) *Attorney, Agent, or Firm* — Keating & Bennett, LLP

(57) ABSTRACT

A switching power supply apparatus includes a voltage step-up converter that increases input voltage in response to turning on and off of a switching element, a transformer including a primary winding and a secondary winding and the primary winding of which is connected to the output of the voltage step-up converter, a microcontroller that controls the turning on and off of the switching element, an input voltage detection circuit that detects input voltage of the microcontroller, and an intermediate bus voltage detection circuit that detects intermediate bus voltage from the microcontroller. The input voltage detection circuit and the intermediate bus voltage detection circuit are circuits including elements having the same specifications. The microcontroller controls the turning on and off of the switching element based on a result of calculation from voltage values detected by the input voltage detection circuit and the intermediate bus voltage detection circuit.

8 Claims, 7 Drawing Sheets

SWITCHING POWER SUPPLY APPARATUS

BACKGROUND OF THE INVENTION

1. Field of the Invention

The present invention relates to a switching power supply apparatus including a voltage step-up converter.

2. Description of the Related Art

In a case of a power supply apparatus that receives power from a commercial power supply and that has high power capacity, a voltage step-up converter for power factor correction (PFC) is practically required to be mounted in order to clear harmonic current regulation. In a case of a power supply apparatus that receives renewable energy, such as sunlight, since input voltage is greatly varied, a power supply apparatus including a voltage step-up converter in its front stage may be configured in order to correct the variation. When such a power supply apparatus including the voltage step-up converter is configured, the voltage step-up converter is controlled so that the voltage step-up converter detects output voltage and compares the output voltage with reference voltage to make the difference between the output voltage and the reference voltage equal to zero in order to output constant voltage. However, an error (deviation) occurs in the output voltage due to, for example, the resistance in wiring or the variation in the reference voltage. Since selection of components or designing of a circuit with a margin for error causes problems including an increase in size of the apparatus, an increase in cost, and a reduction in efficiency, it is necessary to perform correction in order to obtain an output voltage with higher accuracy. Accordingly, Japanese Unexamined Patent Application Publication No. 2009-240063 discloses a technology to suppress the deviation in the output voltage caused by the variation in a reference voltage source or the variation in a resistor voltage divider in a constant-voltage power supply apparatus.

However, since a measuring terminal for externally measuring the voltage is not generally provided in a circuit path, it is not possible to directly measure the output voltage (intermediate bus voltage) of the voltage step-up converter in the case of the power supply apparatus including the voltage step-up converter in its input state. Accordingly, it is not possible to perform a process in which the intermediate bus voltage that is detected with a detection circuit is compared with the intermediate bus voltage that is directly measured to correct the result of the detection of the intermediate bus voltage including the error. As a result, there is a problem in that it is not possible to set the intermediate bus voltage to a certain value not to accurately output the constant voltage from the voltage step-up converter. This problem is not resolved with the technology disclosed in Japanese Unexamined Patent Application Publication NO. 2009-240063.

SUMMARY OF THE INVENTION

Accordingly, preferred embodiments of the present invention provide a switching power supply apparatus capable of correcting a result of detection of an intermediate bus voltage including an error.

A switching power supply apparatus according to a preferred embodiment of the present invention includes a voltage input portion, a front-stage converter that converts input voltage input into the voltage input portion into a certain voltage in response to turning on and off of a first switching element, a subsequent-stage converter that converts output voltage of the front-stage converter into a certain voltage in response to turning on and off of a second switching element, an input voltage detection circuit that detects the input voltage of the front-stage converter, an intermediate bus voltage detection circuit that detects intermediate bus voltage, which is the output voltage of the front-stage converter, and a control unit. The control unit includes a sampling portion that compares detection signals detected by the input voltage detection circuit and the intermediate bus voltage detection circuit with reference voltage for sampling, a voltage calculating portion that calculates measured values of the input voltage and the intermediate bus voltage using the detection signals detected by the input voltage detection circuit and the intermediate bus voltage detection circuit with a certain calculation expression, a storage portion that stores a coefficient of the calculation expression, and a communication portion that transmits the voltage measured values to an external apparatus and receives the coefficient from the external apparatus. The input voltage detection circuit and the intermediate bus voltage detection circuit are circuits including elements having the same specifications. The sampling portion uses the same reference voltage to sample the detection signals detected by the input voltage detection circuit and the intermediate bus voltage detection circuit. The same certain calculation expression is used to calculate the measured values of the input voltage and the intermediate bus voltage and the same coefficient is used in the calculation expression.

With the above configuration, when the input voltage and the intermediate bus voltage (the output voltage) of the front-stage converter are detected, the variation in error does not exist or is negligible, although the error caused by the effect of each element in the detection circuits is included in the result of the detection. Accordingly, it is possible to calculate the measured values for the input voltage and the intermediate bus voltage so that the effect of the error is not caused. In order to measure the input voltage of the front-stage converter, the voltage of the input terminal of the switching power supply apparatus is directly measured. The calculation and storage of the coefficient used in the calculation expression to calculate the measured value from the detection signal of the input voltage detection circuit and the use of the same coefficient in the calculation expression to calculate the intermediate bus voltage measured value from the detection signal of the intermediate bus voltage detection circuit so that the input voltage measured value that is directly measured coincides with the measured value calculated from the input voltage detected by the input voltage detection circuit allow the intermediate bus voltage measured value with no error (or with small error) to be calculated. Accordingly, it is possible to correct the measured value of the intermediate bus voltage without providing a measuring terminal for directly measuring the intermediate bus voltage to configure the compact switching power supply apparatus with high efficiency.

The input voltage detection circuit and the intermediate bus voltage detection circuit are preferably resistor voltage divider circuits, for example.

With the above configuration, it is possible to detect the input voltage and the intermediate bus voltage with a simple configuration.

Resistor elements in the resistor voltage divider circuits preferably have the same manufacturing lot number.

With the above configuration, it is possible to further reduce or prevent the variation in the result of the detection, caused by the effect of each element in the detection circuits.

Each resistor element in the resistor voltage divider circuits is preferably one thin-film network resistor element.

With the above configuration, it is possible to further reduce or prevent the error caused by each element in the detection circuits.

The switching power supply apparatus preferably further includes a first buffer that is connected to an output side at which the detection signal of the input voltage detection circuit is output, and a second buffer that is connected to an output side at which the detection signal of the intermediate bus voltage detection circuit is output.

With the above configuration, it is possible to stably generate the reference signals of the resistor voltage divider circuits to reduce the error in the result of the voltage detection.

The first buffer and the second buffer are preferably circuits including operational amplifiers on one chip.

With the above configuration, it is possible to significantly reduce or prevent the error caused by the effect of the buffers.

The front-stage converter preferably further includes a reference voltage source, a second intermediate bus voltage detection circuit that detects the intermediate bus voltage, an error amplifier that amplifies an error between the reference voltage source and a detection signal of the second intermediate bus voltage detection circuit, and a front-stage converter controller that controls the turning on and off of the first switching element based on an output from the error amplifier. The detection signal of the second intermediate bus voltage detection circuit, which is input into the error amplifier, or the reference voltage is preferably adjusted based on the intermediate bus voltage measured value that is corrected and the adjusted value is preferably stored in the storage portion.

According to various preferred embodiments of the present invention, it is possible to correct the result of the detection of the intermediate bus voltage including any error.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
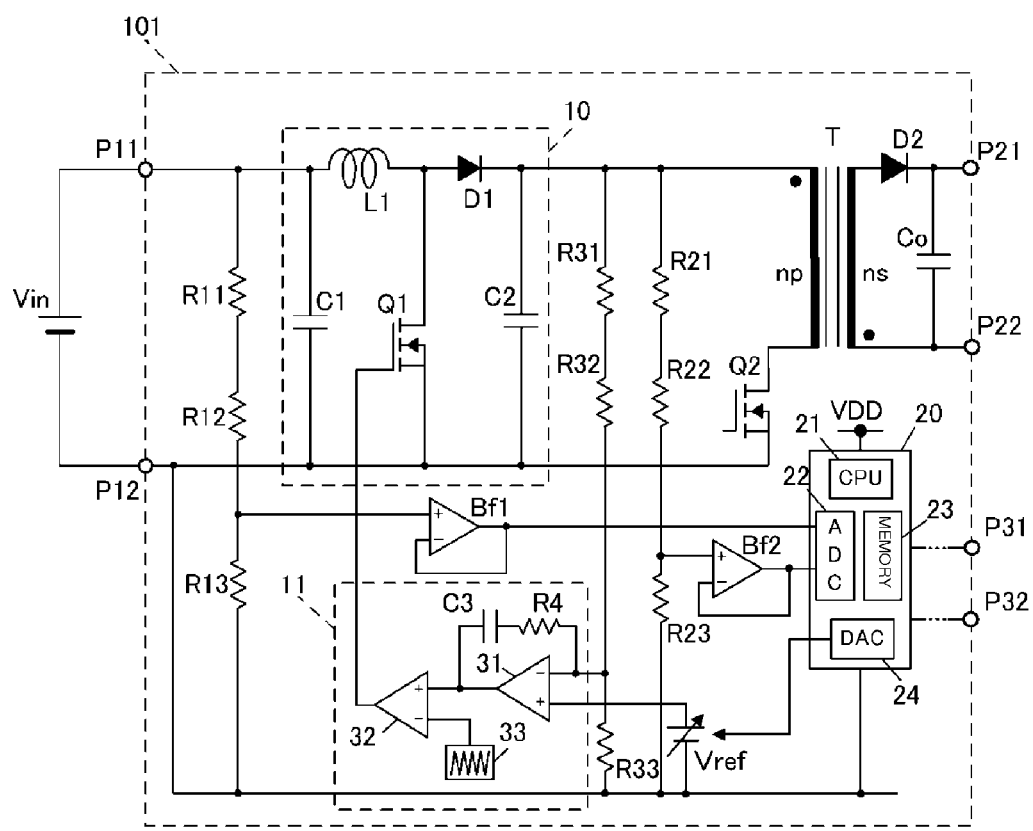
FIG. 1 is a circuit diagram of a switching power supply apparatus according to a first preferred embodiment of the present invention.

FIG. 1 is a circuit diagram of a switching power supply apparatus according to a first preferred embodiment of the present invention. Referring to FIG. 1, a direct-current power supply Vin is connected to voltage input portions P11 and P12 of a switching power supply apparatus 101. A load (not illustrated) is connected to voltage output portions P21 and P22 of the switching power supply apparatus 101.

The switching power supply apparatus 101 includes a voltage step-up converter 10. The voltage supplied from the voltage input portions P11 and P12 is input into the voltage step-up converter 10. The voltage step-up converter 10 includes an inductor L1, a switching element Q1, a diode D1, and capacitors C1 and C2. The switching element Q1 is an n-type metal oxide semiconductor field effect transistor (MOSFET). A gate signal is applied to the switching element Q1 from a voltage step-up converter controller 11 described below and the switching element Q1 is subjected to switching control in response to the gate signal.

A primary winding np of a transformer T is connected to the output of the voltage step-up converter 10. A switching element Q2 is connected in series to the primary winding np. The switching element Q2 is subjected to the switching control by a subsequent-stage converter controller (not illustrated) at a primary side to switch the voltage to be applied to the primary winding np of the transformer T. A rectification smoothing circuit includes a diode D2 and a capacitor Co between a secondary winding ns of the transformer T and the voltage output portions P21 and P22. The rectification smoothing circuit rectifies and smoothes alternating-current voltage occurring at the secondary winding ns of the transformer T.

A detection circuit (not illustrated) which detects output voltage is connected to the voltage output portions P21 and P22 and information about the output voltage that is detected is transmitted to the primary side. The subsequent-stage converter controller at the primary side sets an ON time of the switching element Q2 so that the output voltage is kept to a predetermined value to perform the switching control of the switching element Q2.

The switching power supply apparatus 101 includes an input-side resistor voltage divider circuit and an output-side resistor voltage divider circuit. The input-side resistor voltage divider circuit includes resistors R11, R12, and R13 and detects input voltage to be input into the voltage step-up converter 10. The output-side resistor voltage divider circuit includes resistors R21, R22, and R23 and detects the output voltage (hereinafter referred to as intermediate bus voltage) from the voltage step-up converter 10. The output of the input-side resistor voltage divider circuit is connected to a microcontroller 20 via a buffer Bf1 and the output of the output-side resistor voltage divider circuit is connected to the microcontroller 20 via a buffer Bf2. Each of the buffers Bf1 and Bf2 is a voltage follower circuit. The connection of the buffers Bf1 and Bf2 to the outputs of the resistor voltage divider circuits allows a reference signal of each resistor voltage divider circuit to be stably supplied to the microcontroller 20.

The input-side resistor voltage divider circuit and the output-side resistor voltage divider circuit are circuits in which the same elements are connected to each other in the same manner. Specifically, the resistors R11 and R21 preferably are elements having the same specifications, the resistors R12 and R22 are elements preferably having the same specifications, and the resistors R13 and R23 are elements preferably having the same specifications. The resistors R11, R12, and R13 are connected in series to each other, and the resistors R21, R22, and R23 are also connected in series to each other. The elements preferably having the same specifications mean that the elements preferably have the same pressure specifications and the same product specifications including an error tolerance range and a size, that is, the same part number, in addition to the same nominal resistance. The elements preferably have the same manufacturing lot number. Each of the resistors R11 and R21 is preferably one thin-film network resistor element, for example.

Since the input-side resistor voltage divider circuit and the output-side resistor voltage divider circuit are configured by the elements preferably having the same specifications in the same manner, the errors which are included in the results of the detection of the voltage by the respective circuits and which are caused by the effects of the elements are substantially the same or are negligible. Accordingly, in the correction of the results of the detection including the errors, the input-side resistor voltage divider circuit and the output-side resistor voltage divider circuit are capable of being corrected with the same corrected value. The correction will be described below.

The switching power supply apparatus 101 includes a resistor voltage divider circuit including resistors R31, R32, and R33, and the voltage step-up converter controller 11 including reference voltage Vref, an error amplifier 31, a phase compensation circuit including a capacitor C3 and a resistor R4, a comparator 32, and a triangle-wave oscillator 33. The resistor voltage divider circuit including the resistors R31, R32, and R33 is connected to the output side of the voltage step-up converter 10.

The reference voltage Vref is input into a non-inverting input terminal (+) of the error amplifier 31 and a node between the resistors R32 and R33 is connected to an inverting input terminal (−) of the error amplifier 31. The value of the reference voltage Vref is capable of being adjusted by the microcontroller 20. The output of the error amplifier 31 is fed back to the inverting input terminal (−) via the phase compensation circuit including the capacitor C3 and the resistor R4. The error amplifier 31 amplifies the error in the voltage input into each input terminal to supply the result of the amplification to a non-inverting input terminal (+) of the comparator 32.

The triangle-wave oscillator 33 is connected to an inverting input terminal (−) of the comparator 32. The comparator 32 compares the output voltage from the error amplifier 31 with the output voltage from the triangle-wave oscillator 33 to generate a pulse width modulation (PWM) signal of a duty corresponding to the result of the comparison. A gate signal based on the PWM signal generated by the comparator 32 is input into the gate of the switching element Q1 and the switching element Q1 is driven in response to the gate signal.

The microcontroller 20 operates with a controller drive power supply VDD and includes a central processing unit (CPU) 21, an analog-to-digital (AD) converter (ADC) 22, a memory 23, and a digital-to-analog (DA) converter (DAC) 24. The microcontroller 20 also includes a communication portion that performs data communication with an external apparatus (not illustrated) via external input-output portions P31 and P32. The microcontroller 20 may directly perform the data communication with the external apparatus or may perform the data communication with the external apparatus via a microcontroller at the secondary side. The DA converter 24 corresponds to a sampling portion.

Figure 2:
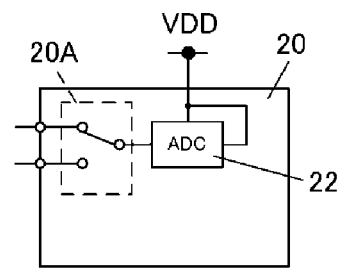
FIG. 2 illustrates a case in which a microcontroller includes one AD converter.
Figure 3:
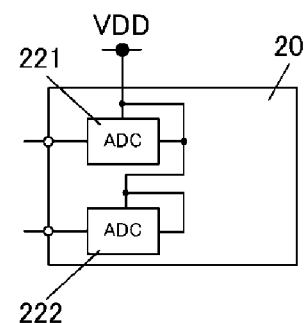
FIG. 3 illustrates a case in which the microcontroller includes two AD converters.

The microcontroller 20 performs analog-to-digital conversion to the reference signal supplied from each of the resistor voltage divider circuits with the AD converter 22 to detect the input voltage and the intermediate bus voltage. The microcontroller 20 may include one AD converter or may include two AD converters. FIG. 2 illustrates a case in which the microcontroller 20 includes one AD converter. FIG. 3 illustrates a case in which the microcontroller 20 includes two AD converters.

In the case in FIG. 2, the microcontroller 20 includes a multiplexer 20A in the front stage of the AD converter 22. One of the reference signals from the input-side resistor voltage divider circuit and the output-side resistor voltage divider circuit is input into the AD converter 22 via the multiplexer 20A. In the preferred embodiment shown in FIG. 3, the microcontroller 20 includes two AD converters 221 and 222 that are driven with the same reference voltage. The input-side resistor voltage divider circuit and the output-side resistor voltage divider circuit are connected to the AD converters 221 and 222, respectively. Although the reference voltage of the AD converters is the controller drive power supply VDD in the first preferred embodiment, another reference voltage may be provided to be used as the reference voltage of the AD converters 221 and 222.

The microcontroller 20 transmits information about an input voltage measured value calculated from the detected input voltage signal with a certain arithmetic expression by the CPU 21 to the external apparatus via the external input-output portions P31 and P32. The CPU 21 corresponds to a voltage calculating portion. The external apparatus is evaluation equipment that evaluates the switching power supply apparatus 101, for example, before factory shipment. The external apparatus calculates coefficients of the calculation expression used by the microcontroller 20 in the switching power supply apparatus 101 to calculate the voltage measured value. The external apparatus calculates the coefficients, for example, before factory shipment of the switching power supply apparatus 101. How to correct the coefficients will now be described.

The voltage step-up converter controller 11 performs the switching control of the switching element Q1 so that the intermediate bus voltage has a specified value. For example, when direct-current voltage of about 340 V to about 400 V is supplied from the direct-current power supply Vin, the voltage step-up converter controller 11 performs the switching control of the switching element Q1 so that the intermediate bus voltage has a constant value of about 410 V. This allows the constant voltage to be output from the switching power supply apparatus 101. The result of the detection of the intermediate bus voltage detected by the microcontroller 20 includes an error caused by the effect of each of the resistors R21, R22, and R23 in the output-side resistor voltage divider circuit and an error caused by the reference voltage of the AD converter 22. Accordingly, it is necessary for the microcontroller 20 to correct the coefficients of the expression to calculate an intermediate bus voltage measured value in order for the switching power supply apparatus 101 to output the constant voltage with high accuracy.

In the calculation of the coefficients, it is necessary to directly measure the intermediate bus voltage of the voltage step-up converter 10 to compare the measured value of the intermediate bus voltage with the measured value detected by the microcontroller 20. However, no measurement terminal is generally provided in a circuit path and, thus, it is not possible to directly measure the intermediate bus voltage of the voltage step-up converter 10. Accordingly, in the first preferred embodiment, the input voltage of the voltage step-up converter 10 preferably is measured from the voltage input portions P11 and P12 to compare the measured value of the input voltage with the measured value measured by the microcontroller 20. The external apparatus calculates the coefficients of the expression to calculate the input voltage measured value of the voltage step-up converter 10. As described above, the input-side resistor voltage divider circuit and the output-side resistor voltage divider circuit preferably have the same elements, the same circuit configuration, and the same reference voltage of the AD converter 22. Specifically, the error caused by the effect of the same element is included in the result of detection of a signal from the input-side resistor voltage divider circuit and the result of detection of a signal from the output-side resistor voltage divider circuit. Accordingly, the coefficients calculated for the input-side resistor voltage divider circuit are preferably used for the output-side resistor voltage divider circuit.

The microcontroller 20 calculates the input voltage measured value using y=ax+b upon detection of the input voltage where x denotes the value of the input voltage detected by the microcontroller 20 and y denotes the input voltage measured value. A division ratio of the voltage of the resistors R11, R12, and R13 and resolution of the AD converter 22 are known. The input voltage input into the voltage step-up converter 10, which is measured by a high-accuracy measurement apparatus, is input into the external apparatus. The external apparatus compares the input voltage measured by the measurement apparatus with the input voltage measured by the microcontroller 20 to calculate coefficients a and b in the above expression from the result of the comparison and the known values. The external apparatus transmits the calculated coefficients a and b to the microcontroller 20 in the switching power supply apparatus 101.

The microcontroller 20 stores the corrected values a and b in the memory 23. Upon detection of the intermediate bus voltage when the switching power supply apparatus 101 is driven, the microcontroller 20 uses the corrected values a and b stored in the memory 23 to transmit the measured value to the external apparatus. The external apparatus transmits a signal to the microcontroller 20 so that the intermediate bus voltage measured value subjected to the error correction has a desired value. The DA converter 24 outputs a signal to adjust the value of the reference voltage Vref. Storage of the adjusted value in the memory 23 allows the switching element Q1 to be subjected to the switching control so that the intermediate bus voltage has a constant value also after shipment and the stable output voltage is output from the voltage step-up converter 10 with high accuracy.

As described above, the switching power supply apparatus 101 according to the first preferred embodiment is capable of using the correction of the error of the input voltage as the correction of the error of the intermediate bus voltage. Accordingly, it is not necessary to provide the measuring terminal for directly measuring the intermediate bus voltage.

Although the buffers Bf1 and Bf2 preferably are provided in the first preferred embodiment, the buffers Bf1 and Bf2 may not be provided. However, since the provision of the buffers Bf1 and Bf2 increases input impedance, the operation of a sample-and-hold circuit (not illustrated) in the front stage of the AD converter 22 prevents the reference signals of the resistor voltage divider circuits from being affected and the microcontroller 20 is capable of obtaining the result of the detection with higher accuracy. When the buffers Bf1 and Bf2 are provided, the buffers Bf1 and Bf2 are preferably operational amplifiers on one integrated circuit (IC) in order to significantly reduce or prevent the variation in the error caused by the effect of the buffers Bf1 and Bf2.

When a diode for protection against reverse connection is connected to the voltage input portion P11, the input-side resistor voltage divider circuit including the resistors R11, R12, and R13 preferably is provided in the front stage or the subsequent stage of the diode for protection against reverse connection. However, the provision of the input-side resistor voltage divider circuit in the front stage of the diode for protection against reverse connection is preferable because the effect of forward voltage drop of the diode is significantly reduced or prevented.

Second Preferred Embodiment

A switching power supply apparatus according to a second preferred embodiment of the present invention will now be described. In the switching power supply apparatus according to the second preferred embodiment, the voltage step-up converter 10 in the switching power supply apparatus according to the first preferred embodiment preferably is used as a PFC converter. The PFC converter performs control so that current flowing through the inductor in response to turning on and off of the switching element has a sinusoidal wave pattern, like the input voltage into the PFC converter. The difference from the first preferred embodiment will be described below. The circuit configuration of the PFC converter is the same as that of the voltage step-up converter according to the first preferred embodiment, the same reference numeral is used for description.

Figure 4:
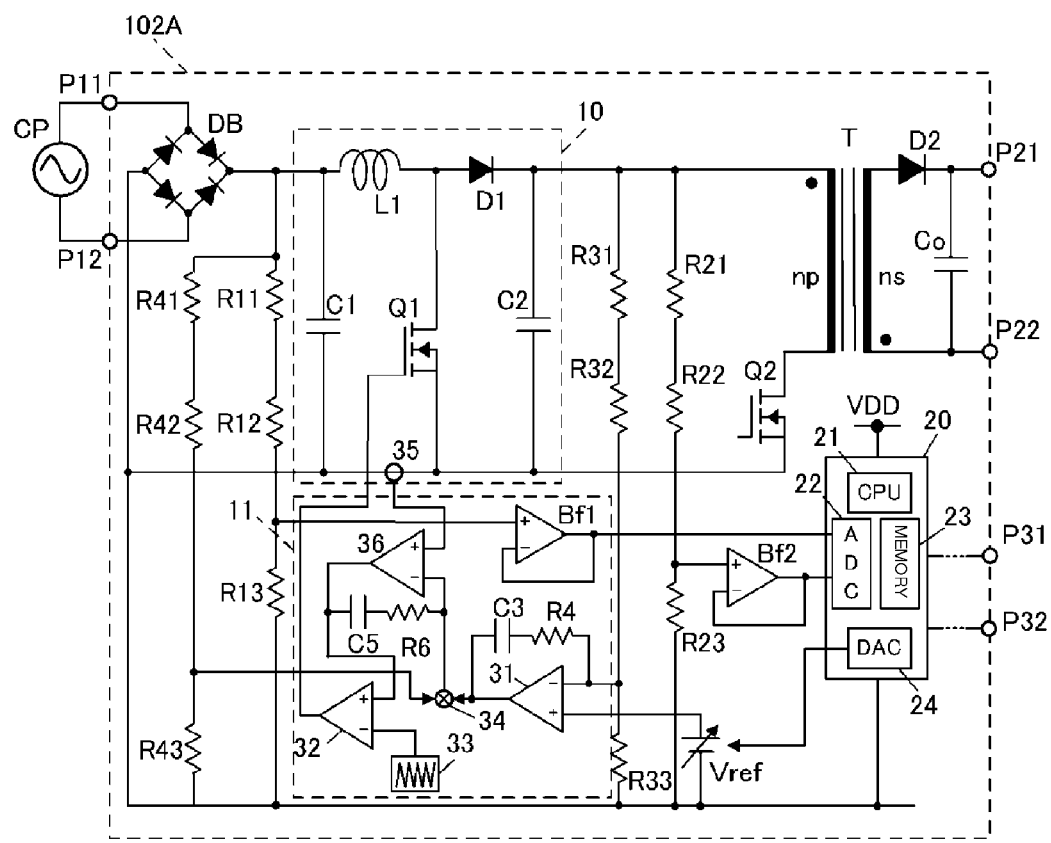
FIG. 4 is a circuit diagram of a switching power supply apparatus according to a second preferred embodiment of the present invention.

FIG. 4 is a circuit diagram of the switching power supply apparatus according to the second preferred embodiment. Referring to FIG. 4, a commercial power supply CP is connected to the voltage input portions P11 and P12 of a switching power supply apparatus 102A. The switching power supply apparatus 102A includes a diode bridge DB. The alternating-current voltage supplied from the voltage input portions P11 and P12 is subjected to rectification in the diode bridge DB and is supplied to the voltage step-up converter 10, which is the PFC converter. The voltage step-up converter controller 11 additionally includes the output voltage error amplifier 31, an input voltage detection circuit including resistors R41, R42, and R43, a multiplier 34, an inductor current detection circuit 35, a current error amplifier 36, and a phase compensation circuit including a capacitor C5 and a resistor R6 so that the voltage step-up converter 10 is controlled as the PFC converter. The remaining configuration of the switching power supply apparatus 102A is preferably the same or substantially the same as in the first preferred embodiment.

Figure 5:
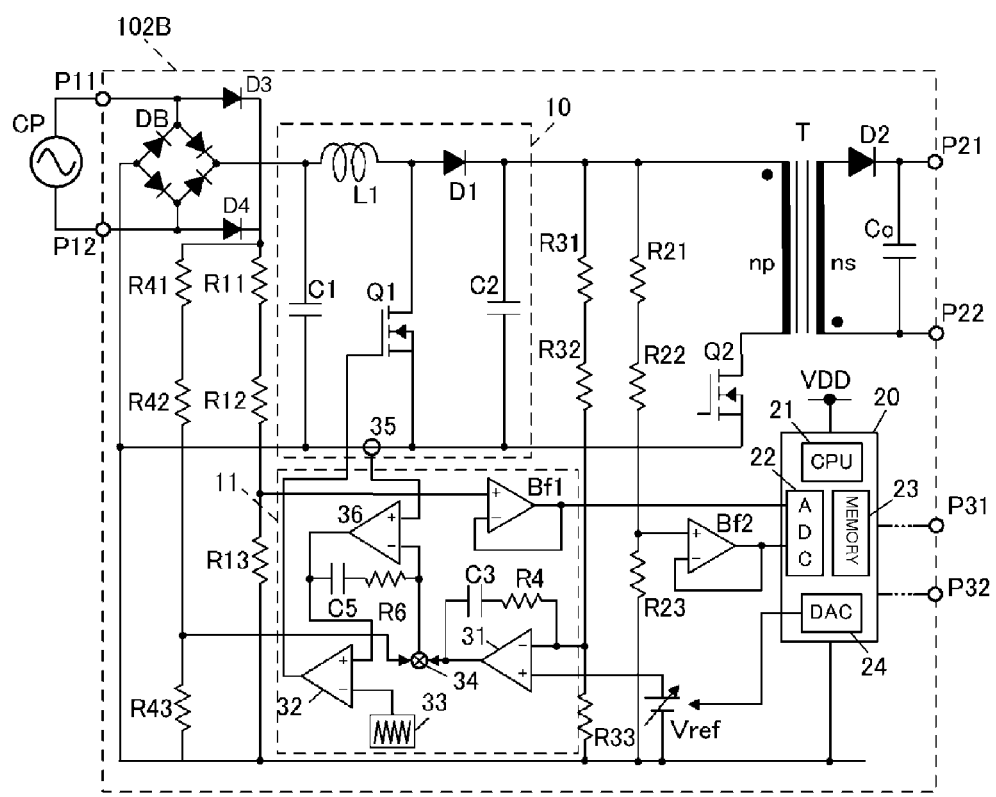
FIG. 5 is a circuit diagram of a switching power supply apparatus according to a modification of the second preferred embodiment of the present invention.

FIG. 5 is a circuit diagram of a switching power supply apparatus 102B according to a modification of the second preferred embodiment of the present invention. In the circuit in FIG. 5, the switching power supply apparatus 102B rectifies the alternating-current voltage supplied from the voltage input portions P11 and P12 with the diode bridge DB to supply the rectified alternating-current voltage to the voltage step-up converter 10, which is the PFC converter. The switching power supply apparatus 102B includes diodes D3 and D4 connected to a node of the diode bridge DB. The input-side resistor voltage divider circuit is connected to the cathodes of the diodes D3 and D4. In other words, in the circuit in FIG. 5, the input voltage of the voltage step-up converter 10 is detected through a signal line different from the signal line through which the alternating-current voltage is input into the voltage step-up converter 10. Since the diodes D3 and D4 preferably are low current capacity (signal) diodes, has small forward voltage drop, and has small variation in the forward voltage drop, it is possible to improve the detection accuracy of the input voltage.

Also in the circuit configurations of the second preferred embodiment, the correction of the error of the input voltage is capable of being used as the correction of the error of the intermediate bus voltage, as in the first preferred embodiment. Accordingly, it is not necessary to provide the measuring terminal for directly measuring the intermediate bus voltage.

Third Preferred Embodiment

A switching power supply apparatus according to a third preferred embodiment of the present invention will now be described. The switching power supply apparatus according to the third preferred embodiment differs from the switching power supply apparatus of the first preferred embodiment in the circuit configuration in which the gate signal is supplied to the switching element Q1 of the voltage step-up converter 10 according to the first preferred embodiment.

Figure 6:
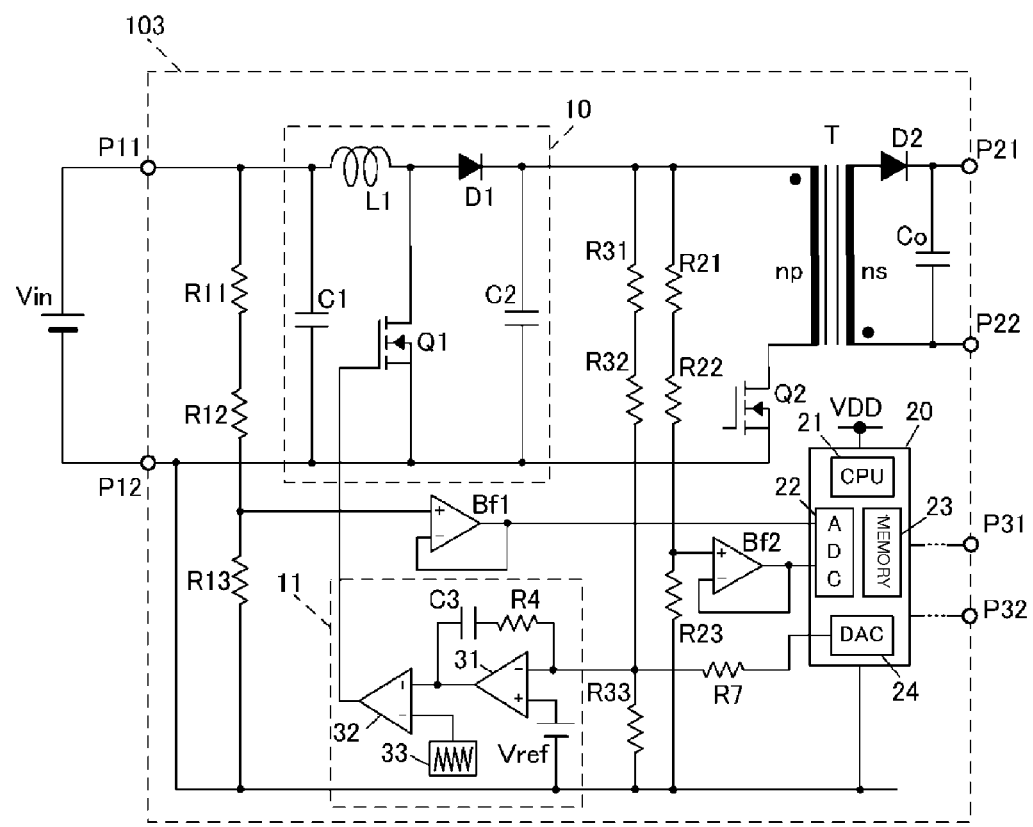
FIG. 6 is a circuit diagram of a switching power supply apparatus according to a third preferred embodiment of the present invention.

FIG. 6 is a circuit diagram of the switching power supply apparatus according to the third preferred embodiment. In the circuit in FIG. 6, the constant reference voltage Vref is connected to the non-inverting input terminal (+) of the error amplifier 31 in a switching power supply apparatus 103, and the DA converter 24 in the microcontroller 20 is connected to the inverting input terminal (−) of the error amplifier 31 via a resistor R7. As in the first preferred embodiment, the output from the error amplifier 31 is corrected with the microcontroller 20. The remaining configuration of the switching power supply apparatus 103 preferably is the same or substantially the same as in the first preferred embodiment.

Also in the circuit configuration of the third preferred embodiment, the correction of the error of the input voltage is capable of being used as the correction of the error of the intermediate bus voltage, as in the first preferred embodiment. Accordingly, it is not necessary to provide the measuring terminal for directly measuring the intermediate bus voltage.

Fourth Preferred Embodiment

A switching power supply apparatus according to a fourth preferred embodiment of the present invention will now be described. The switching power supply apparatus according to the fourth preferred embodiment differs from the switching power supply apparatus of the first preferred embodiment in that the switching power supply apparatus according to the fourth preferred embodiment preferably includes a master controller 40 and does not include the DA converter 24. In the fourth preferred embodiment, the microcontroller 20 is connected to the master controller 40 outside the switching power supply apparatus. The master controller 40 transmits and receives a variety of information by communication to issue an instruction to the switching power supply apparatus and monitor the state of the switching power supply apparatus.

Figure 7:
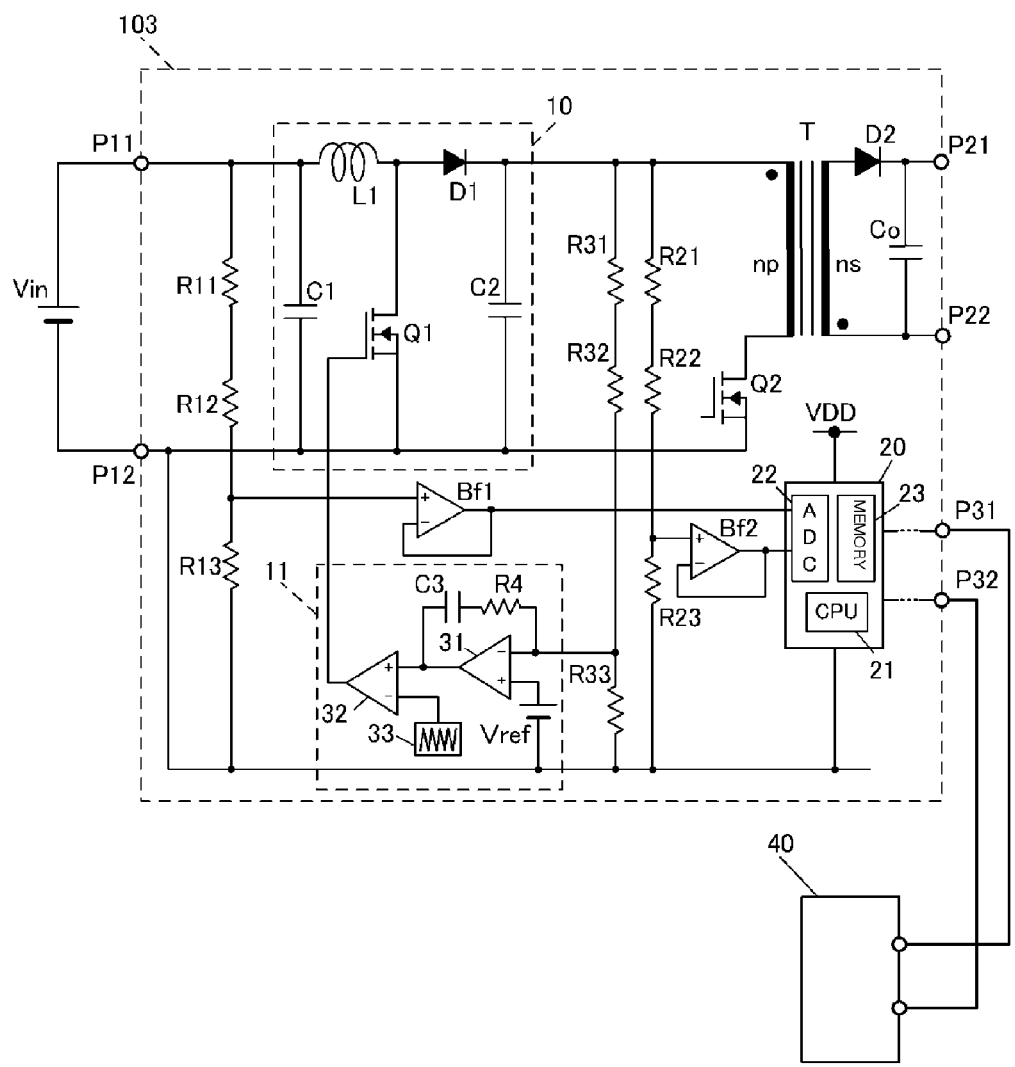
FIG. 7 is a circuit diagram of a switching power supply apparatus according to a fourth preferred embodiment of the present invention.

FIG. 7 is a circuit diagram of the switching power supply apparatus according to the fourth preferred embodiment. The master controller 40 is connected to the switching power supply apparatus via the external input-output portions P31 and P32.

Since the intermediate bus voltage concerns energy accumulated in the capacitor C2, the intermediate bus voltage is one piece of important information used to calculate an instantaneous power interruption holding time.

As described above in the first preferred embodiment, the use of the correction of the error of the input voltage as the correction of the error of the intermediate bus voltage allows accurate information about the intermediate bus voltage to be transmitted to the master controller 40.

The configuration in which the reference voltage Vref of the voltage step-up converter is corrected in the first preferred embodiment and the configuration in which the voltage at the node between the resistors R32 and R33 is corrected in the third preferred embodiment are not provided in the switching power supply apparatus of the fourth preferred embodiment in FIG. 7. However, any variation in the information about the intermediate bus voltage causes an error in the calculation of the instantaneous power interruption holding time. Since such an error is corrected in the fourth preferred embodiment, it is possible to realize the monitoring of the state of the switching power supply apparatus with high accuracy.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a voltage input portion;
   an front-stage converter configured to convert input voltage input into the voltage input portion into a first voltage in response to turning on and off of a first switching element;
   a subsequent-stage converter configured to convert an output voltage of the front-stage converter into a second voltage in response to turning on and off of a second switching element;
   an input voltage detection circuit configured to detect the input voltage of the front-stage converter;
   an intermediate bus voltage detection circuit configured to detect an intermediate bus voltage, which is the output voltage of the front-stage converter; and
   a control unit configured to and programmed to include:
      a sampling portion configured to compare detection signals detected by the input voltage detection circuit and the intermediate bus voltage detection circuit with a reference voltage for sampling;
      a voltage calculating portion configured to calculate measured values of the input voltage and the intermediate bus voltage using the detection signals detected by the input voltage detection circuit and the intermediate bus voltage detection circuit with a calculation expression;
      a storage portion configured to store a coefficient of the calculation expression; and
      a communication portion configured to transmit the voltage measured values to an external apparatus and receive the coefficient from the external apparatus; wherein
   the input voltage detection circuit and the intermediate bus voltage detection circuit are circuits including elements having the same specifications;
   the sampling portion uses a same reference voltage to sample the detection signals detected by the input voltage detection circuit and the intermediate bus voltage detection circuit; and
   a same calculation expression is used to calculate the measured values of the input voltage and the intermediate bus voltage and a same coefficient is used in the calculation expression.

2. The switching power supply apparatus according to claim 1, wherein the input voltage detection circuit and the intermediate bus voltage detection circuit are resistor voltage divider circuits.

3. The switching power supply apparatus according to claim 2, wherein resistor elements in the resistor voltage divider circuits have the same specifications.

4. The switching power supply apparatus according to claim 2, wherein resistor elements in the resistor voltage divider circuits have a same manufacturing lot number.

5. The switching power supply apparatus according to claim 2,
   wherein each resistor element in the resistor voltage divider circuits is one thin-film network resistor element.

6. The switching power supply apparatus according to claim 1, further comprising:
   a first buffer that is connected to an output side at which the detection signal of the input voltage detection circuit is output; and
   a second buffer that is connected to an output side at which the detection signal of the intermediate bus voltage detection circuit is output.

7. The switching power supply apparatus according to claim 6,
   wherein the first buffer and the second buffer are circuits including operational amplifiers on one chip.

8. The switching power supply apparatus according to claim 1, wherein
   the front-stage converter further includes a reference voltage source, a second intermediate bus voltage detection circuit configured to detect the intermediate bus voltage, an error amplifier configured to amplify an error between the reference voltage source and a detection signal of the second intermediate bus voltage detection circuit, and a front-stage converter controller configured and programmed to control the turning on and off of the first switching element based on an output from the error amplifier; and
   the detection signal of the second intermediate bus voltage detection circuit, which is input into the error amplifier, or the reference voltage, is adjusted based on the intermediate bus voltage measured value that is corrected and the adjusted value is stored in the storage portion.

\* \* \* \* \*